United States Patent
Park et al.

(10) Patent No.: US 9,467,915 B2
(45) Date of Patent: Oct. 11, 2016

(54) METHOD AND APPARATUS FOR TRANSMITTING HANDOVER REPORT MESSAGE IN WIRELESS COMMUNICATION SYSTEM

(71) Applicant: LG Electronics Inc., Seoul (KR)

(72) Inventors: Kyung Min Park, Gyeonggi-do (KR); Dae Wook Byun, Gyeonggi-do (KR); Jin Sook Ryu, Gyeonggi-do (KR); Jian Xu, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 64 days.

(21) Appl. No.: 14/368,583

(22) PCT Filed: Jan. 29, 2013

(86) PCT No.: PCT/KR2013/000711
§ 371 (c)(1),
(2) Date: Jun. 25, 2014

(87) PCT Pub. No.: WO2013/115543
PCT Pub. Date: Aug. 8, 2013

(65) Prior Publication Data
US 2014/0378136 A1    Dec. 25, 2014

Related U.S. Application Data

(60) Provisional application No. 61/592,004, filed on Jan. 30, 2012, provisional application No. 61/592,561, filed on Jan. 30, 2012.

(51) Int. Cl.
| | |
|---|---|
| *H04L 12/24* | (2006.01) |
| *H04W 36/16* | (2009.01) |
| *H04W 36/08* | (2009.01) |
| *H04W 36/00* | (2009.01) |
| *H04W 36/38* | (2009.01) |
| *H04W 24/04* | (2009.01) |

(52) U.S. Cl.
CPC ........ *H04W 36/165* (2013.01); *H04L 41/0668* (2013.01); *H04W 24/04* (2013.01); *H04W 36/0005* (2013.01); *H04W 36/0055* (2013.01); *H04W 36/38* (2013.01); *H04W 36/08* (2013.01)

(58) Field of Classification Search
CPC .......... H04W 36/0005; H04W 36/38; H04W 36/08; H04W 36/165; H04W 24/04; H04W 36/0055; H04L 41/0668
See application file for complete search history.

(56) References Cited

U.S. PATENT DOCUMENTS

| | | | |
|---|---|---|---|
| 2010/0173626 A1 | 7/2010 | Catovic et al. | |
| 2014/0148174 A1* | 5/2014 | Teyeb ............... | H04W 36/0083 455/441 |

FOREIGN PATENT DOCUMENTS

EP    2386171 A2    11/2011

OTHER PUBLICATIONS

Li et al., "Personal Communication Systems (PCS)," Proceedings of the IEEE, 83: 1210-1243 (1995).
International Search Report issued in corresponding International Patent Application No. PCT/KR2013/000711 dated Apr. 25, 2013.

* cited by examiner

*Primary Examiner* — Dinh P Nguyen
(74) *Attorney, Agent, or Firm* — Morgan, Lewis & Bockius LLP

(57) ABSTRACT

A method and apparatus for transmitting a handover report message in a wireless communication system is provided. A first eNodeB (eNB) serves a first cell which is a coverage hole compensating cell between a source cell and a second cell, and a user equipment (UE) is moving from the source cell to the second cell through the first cell. The first eNB performs a handover procedure for a user equipment (UE) with a source eNB serving the source cell, receives a radio link failure (RLF) indication message from a second eNB serving the second cell, and transmits a handover report message to the source eNB, the handover report message including an indicator which informs the radio link failure.

12 Claims, 8 Drawing Sheets

FIG. 3
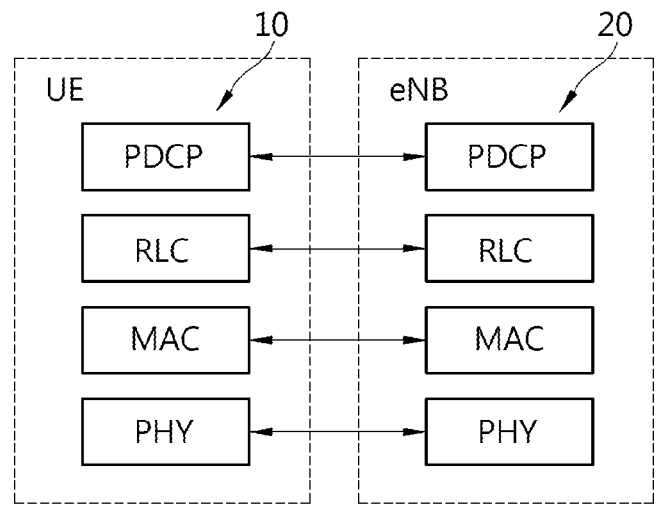
(a)
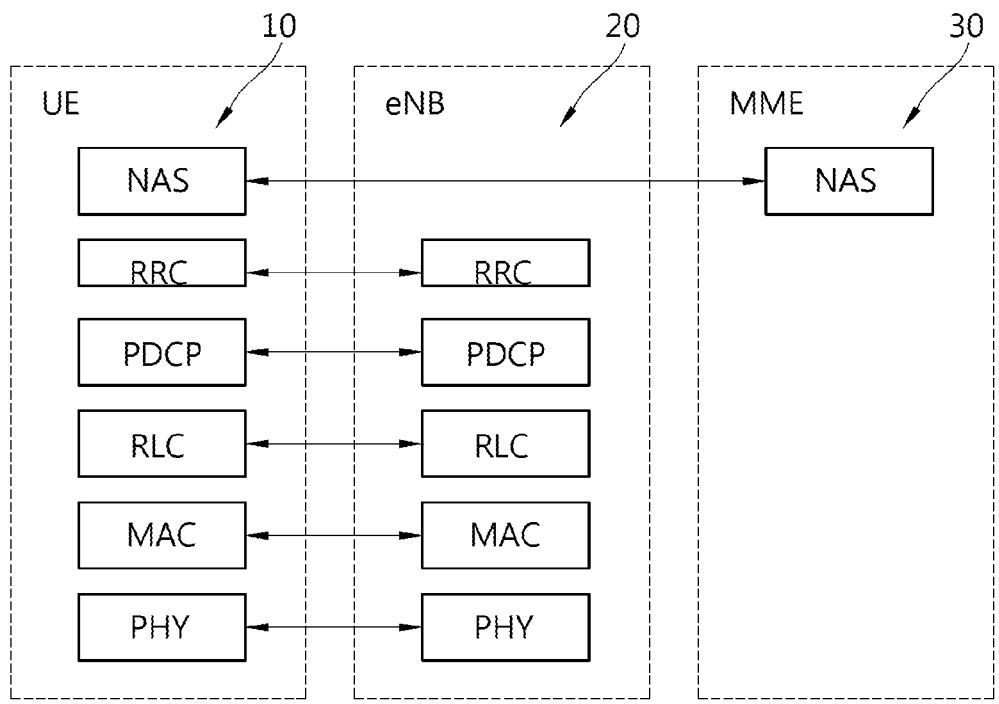
(b)

METHOD AND APPARATUS FOR TRANSMITTING HANDOVER REPORT MESSAGE IN WIRELESS COMMUNICATION SYSTEM

BACKGROUND OF THE INVENTION

1. Field of the Invention

The present invention relates to wireless communication, and more particularly, to a method and apparatus for transmitting a handover report message in a wireless communication system.

2. Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows network structure of an evolved universal mobile telecommunication system (E-UMTS). The E-UMTS may be also referred to as an LTE system. The communication network is widely deployed to provide a variety of communication services such as voice over internet protocol (VoIP) through IMS and packet data.

As illustrated in FIG. 1, the E-UMTS network includes an evolved UMTS terrestrial radio access network (E-UTRAN), an evolved packet core (EPC) and one or more user equipment. The E-UTRAN may include one or more evolved NodeB (eNB) 20, and a plurality of user equipment (UE) 10. One or more E-UTRAN mobility management entity (MME)/system architecture evolution (SAE) gateways (S-GW) 30 may be positioned at the end of the network and connected to an external network.

As used herein, "downlink" refers to communication from eNB 20 to UE 10, and "uplink" refers to communication from the UE to an eNB. UE 10 refers to communication equipment carried by a user and may be also referred to as a mobile station (MS), a user terminal (UT), a subscriber station (SS) or a wireless device.

An eNB 20 provides end points of a user plane and a control plane to the UE 10. MME/S-GW 30 provides an end point of a session and mobility management function for UE 10. The eNB and MME/S-GW may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including non-access stratum (NAS) signaling to eNBs 20, NAS signaling security, access stratum (AS) security control, Inter core network (CN) node signaling for mobility between 3GPP access networks, Idle mode UE reachability (including control and execution of paging retransmission), tracking area list management (for UE in idle and active mode), packet data network (PDN) GW and serving GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g. deep packet inspection), lawful interception, UE internet protocol (IP) address allocation, transport level packet marking in the downlink, UL and DL service level charging, gating and rate enforcement, DL rate enforcement based on APN-AMBR. For clarity MME/S-GW 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

FIG. 2 shows architecture of a typical E-UTRAN and a typical EPC.

As illustrated, eNB 20 may perform functions of selection for gateway 30, routing toward the gateway during a radio resource control (RRC) activation, scheduling and transmitting of paging messages, scheduling and transmitting of broadcast channel (BCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a user-plane protocol and a control-plane protocol stack for the E-UMTS.

FIG. 3(a) is block diagram depicting the user-plane protocol, and FIG. 3(b) is block diagram depicting the control-plane protocol. As illustrated, the protocol layers may be divided into a first layer (L1), a second layer (L2) and a third layer (L3) based upon the three lower layers of an open system interconnection (OSI) standard model that is well known in the art of communication systems.

The physical layer, the L1, provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of the L2 provides services to a radio link control (RLC) layer (which is a higher layer) via a logical channel. The RLC layer of the L2 supports the transmission of data with reliability. It should be noted that the RLC layer illustrated in FIGS. 3(a) and 3(b) is depicted because if the RLC functions are implemented in and performed by the MAC layer, the RLC layer itself is not required. A packet data convergence protocol (PDCP) layer of the L2 performs a header compression function that reduces unnecessary control information such that data being transmitted by employing IP packets, such as IPv4 or IPv6, can be efficiently sent over a radio (wireless) interface that has a relatively small bandwidth.

A radio resource control (RRC) layer located at the lowest portion of the L3 is only defined in the control plane and controls logical channels, transport channels and the physical channels in relation to the configuration, reconfiguration, and release of the radio bearers (RBs). Here, the RB signifies a service provided by the L2 for data transmission between the terminal and the UTRAN.

As illustrated in FIG. 3(a), the RLC and MAC layers (terminated in an eNB 20 on the network side) may perform functions such as scheduling, automatic repeat request (ARQ), and hybrid automatic repeat request (HARQ). The PDCP layer (terminated in eNB 20 on the network side) may perform the user plane functions such as header compression, integrity protection, and ciphering.

As illustrated in FIG. 3(b), the RLC and MAC layers (terminated in an eNodeB 20 on the network side) perform the same functions for the control plane. As illustrated, the RRC layer (terminated in an eNB 20 on the network side) may perform functions such as broadcasting, paging, RRC connection management, RB control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a discontinuous reception (DRX) configured by NAS, and the UE has been allocated an identification (ID) which uniquely identifies the UE in a tracking area and may perform PLMN selection and cell re-selection. Also, in RRC_IDLE state, no RRC context is stored in the eNB.

In RRC_CONNECTED state, the UE 10 has an E-UTRAN RRC connection and a context in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE 10 specifies the paging DRX cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

FIG. 4 shows an example of structure of a physical channel.

The physical channel transfers signaling and data between layer L1 of a UE and eNB. As illustrated in FIG. 4, the physical channel transfers the signaling and data with a radio resource, which consists of one or more sub-carriers in frequency and one more symbols in time.

One sub-frame, which is 1 ms in length, consists of several symbols. The particular symbol(s) of the sub-frame, such as the first symbol of the sub-frame, can be used for downlink control channel (PDCCH). PDCCHs carry dynamic allocated resources, such as PRBs and modulation and coding scheme (MCS).

A transport channel transfers signaling and data between the L1 and MAC layers. A physical channel is mapped to a transport channel.

Downlink transport channel types include a broadcast channel (BCH), a downlink shared channel (DL-SCH), a paging channel (PCH) and a multicast channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an uplink shared channel (UL-SCH) and random access channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

In intra and inter frequency and inter radio access technology (RAT) mobility, a mobility failure case consists of a handover subject to failure either within the same RAT or between different RATs or a failure followed by a reconnection in another cell either within the same RAT or in a different RAT. Specifically, some examples of mobility failure may occur during mobility in a heterogeneous network (HetNet). It may be referred to as 'HetNet intra LTE failure cases'.

A method for solving the HetNet intra LTE failure cases is required.

SUMMARY OF THE INVENTION

The present invention provides a method and apparatus for transmitting a handover report message in a wireless communication system. The present invention provides a method for transmitting the handover report message including an indicator.

In an aspect, a method for transmitting, by a first eNodeB (eNB), a handover report message in a wireless communication system is provided. The first eNB serves a first cell which is a coverage hole compensating cell between a source cell and a second cell. The method includes performing a handover procedure for a user equipment (UE) with a source eNB serving the source cell, receiving a radio link failure (RLF) indication message from a second eNB serving the second cell, and transmitting a handover report message to the source eNB, the handover report message including an indicator which informs the radio link failure.

In another aspect, a method for receiving, by a source eNodeB (eNB), a handover report message in a wireless communication system is provided. A first target eNB serves a first target cell which is a coverage hole compensating cell between a source cell served by the source eNB and a second target cell. The method includes performing a handover procedure for a user equipment (UE) with the first target eNB, and receiving a handover report message from the first target eNB, the handover report message including an indicator which informs the radio link failure in the second target cell.

In another aspect, a first eNodeB (eNB) in a wireless communication system is provided. The first eNB serves a first cell which is a coverage hole compensating cell between a source cell and a second cell. The first eNB includes a radio frequency (RF) unit for transmitting or receiving a radio signal, and a processor, operatively coupled to the RF unit, and configured for performing a handover procedure for a user equipment (UE) with a source eNB serving the source cell, receiving a radio link failure (RLF) indication message from a second eNB serving the second cell, and transmitting a handover report message to the source eNB, the handover report message including an indicator which informs the radio link failure.

A HetNet intra LTE failure case with a coverage hole compensation cell can be avoided.

BRIEF DESCRIPTION OF THE DRAWINGS

FIG. 3 shows a user-plane protocol and a control-plane protocol stack for the E-UMTS.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
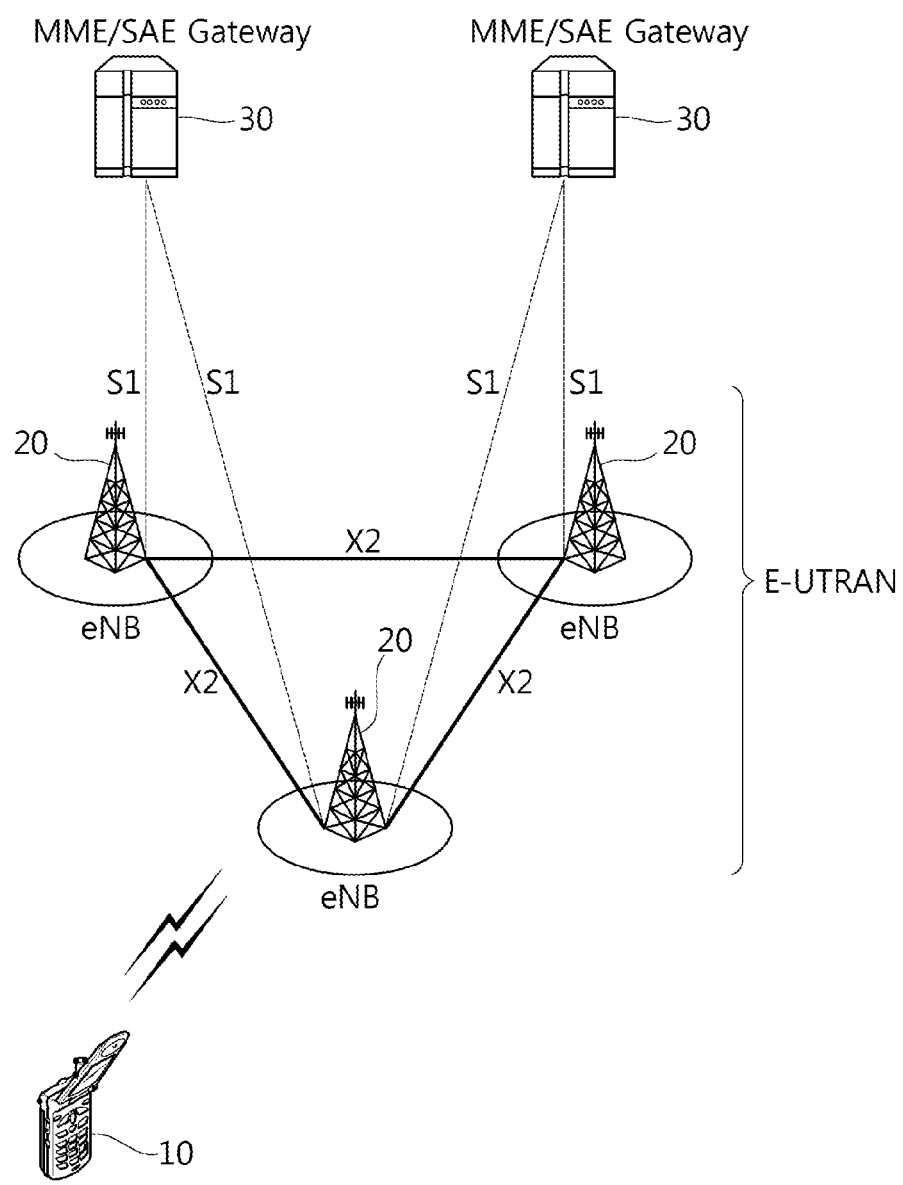
FIG. 1 shows network structure of an evolved universal mobile telecommunication system (E-UMTS).
Figure 2:
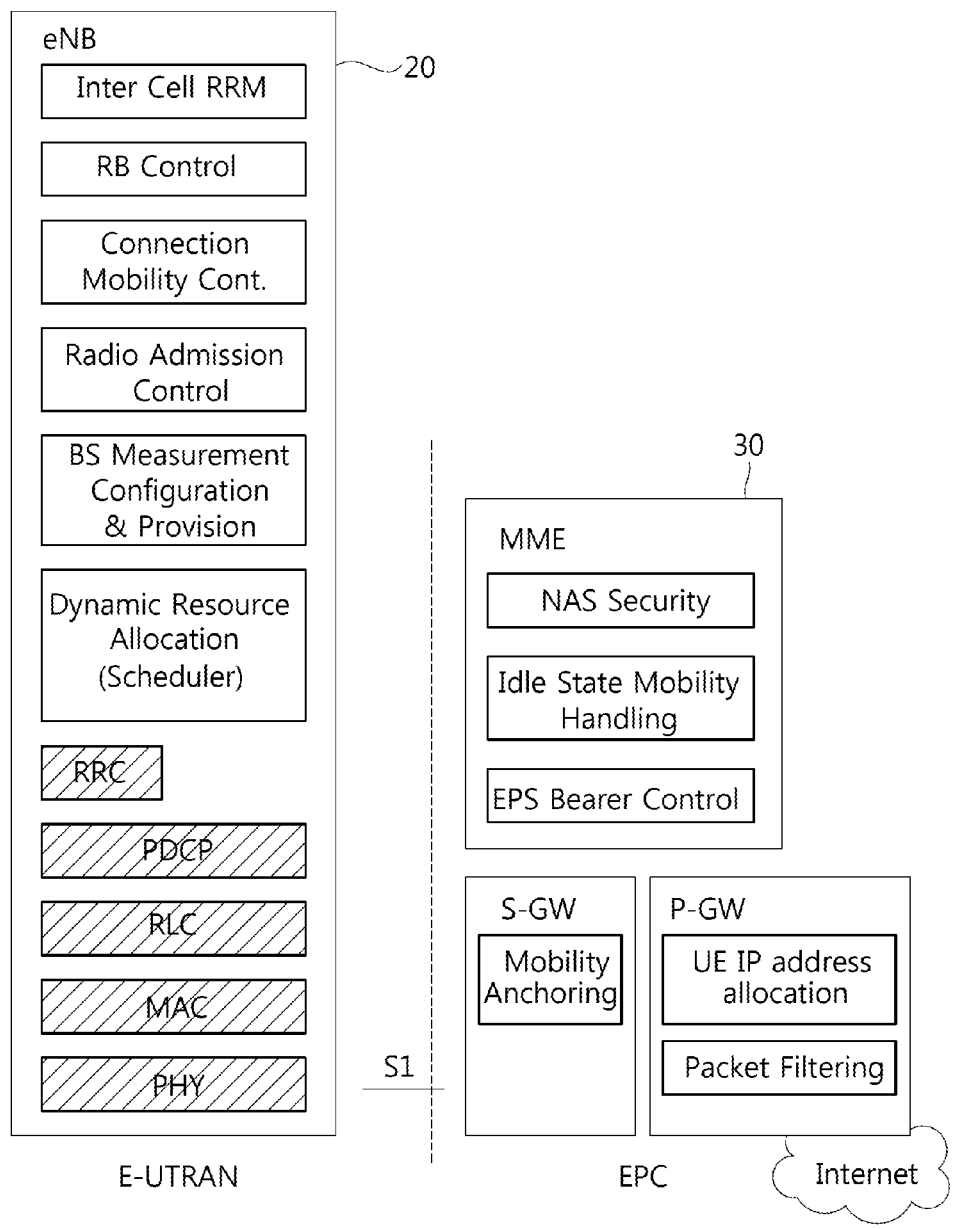
FIG. 2 shows architecture of a typical E-UTRAN and a typical EPC.
Figure 4:
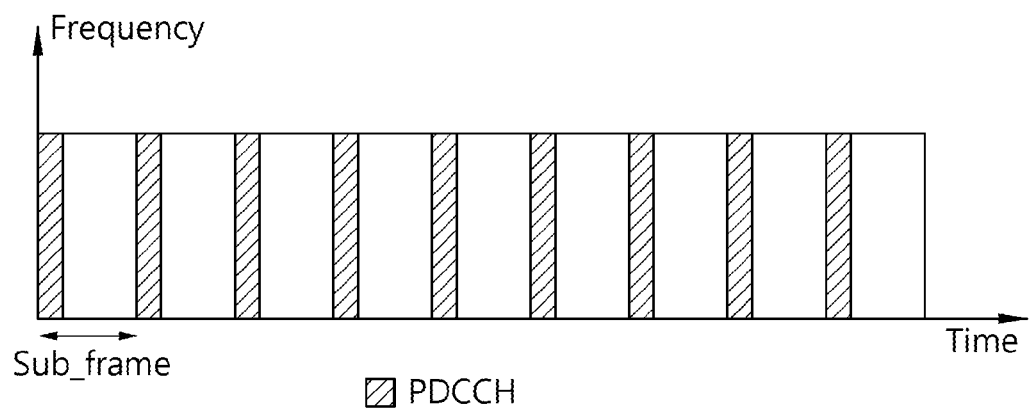
FIG. 4 shows an example of structure of a physical channel.
Figure 5:
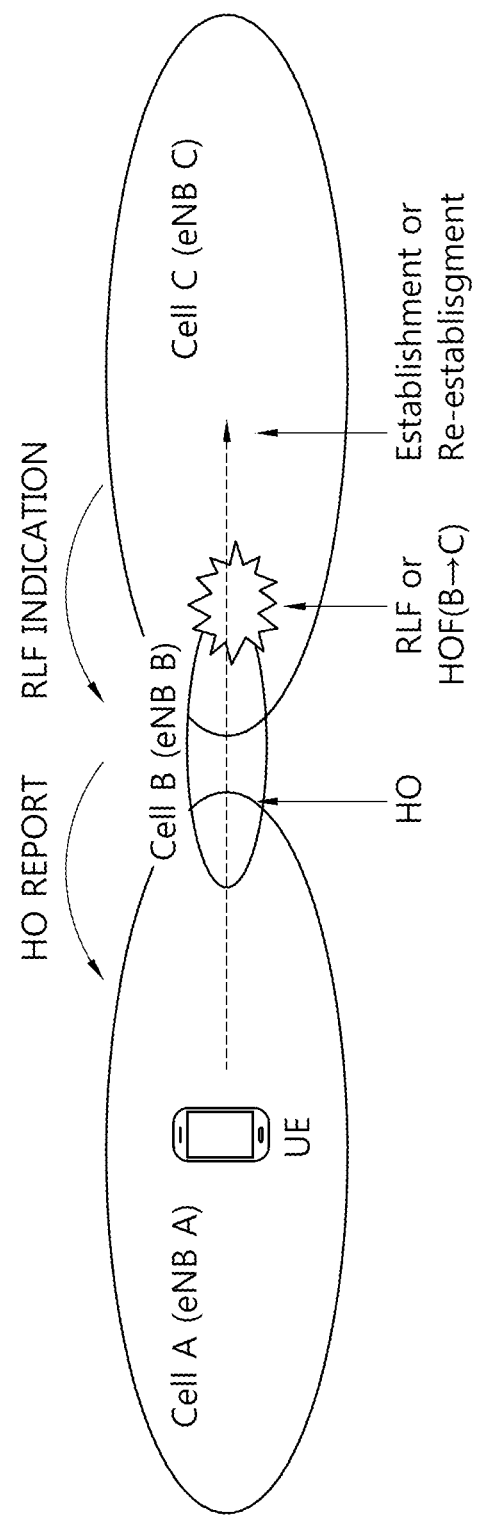
FIG. 5 shows an example of HetNet intra LTE failure cases.

FIG. 5 shows an example of HetNet intra LTE failure cases.

Referring to FIG. 5, cell B is located between cell A and cell C in order to compensate a coverage hole. That is, the cell A and the cell C do not overlap, and the cell B covers the area where the cell A and the cell C do not cover. A UE is moving from the cell A to the cell C through the cell B with high speed. The UE prepares a handover procedure from the cell A to the cell B. However, shortly after the handover procedure form the cell A to the cell B is completed, a radio link failure (RLF) or a handover failure (HOF) from the cell B to the cell C occurs due to the high speed of the UE. The UE establishes or reestablishes to the cell C. An eNB C serving the cell C may transmit a RLF indication message to an eNB B serving the cell B. The RLF indication message may be based on a RLF report received from the UE. The eNB B may transmit a handover report message to an eNB A serving the cell A. The HetNet intra LTE failure described above is very common in a HetNet environment, because many pico eNBs are installed to compensate the coverage holes.

Figure 6:
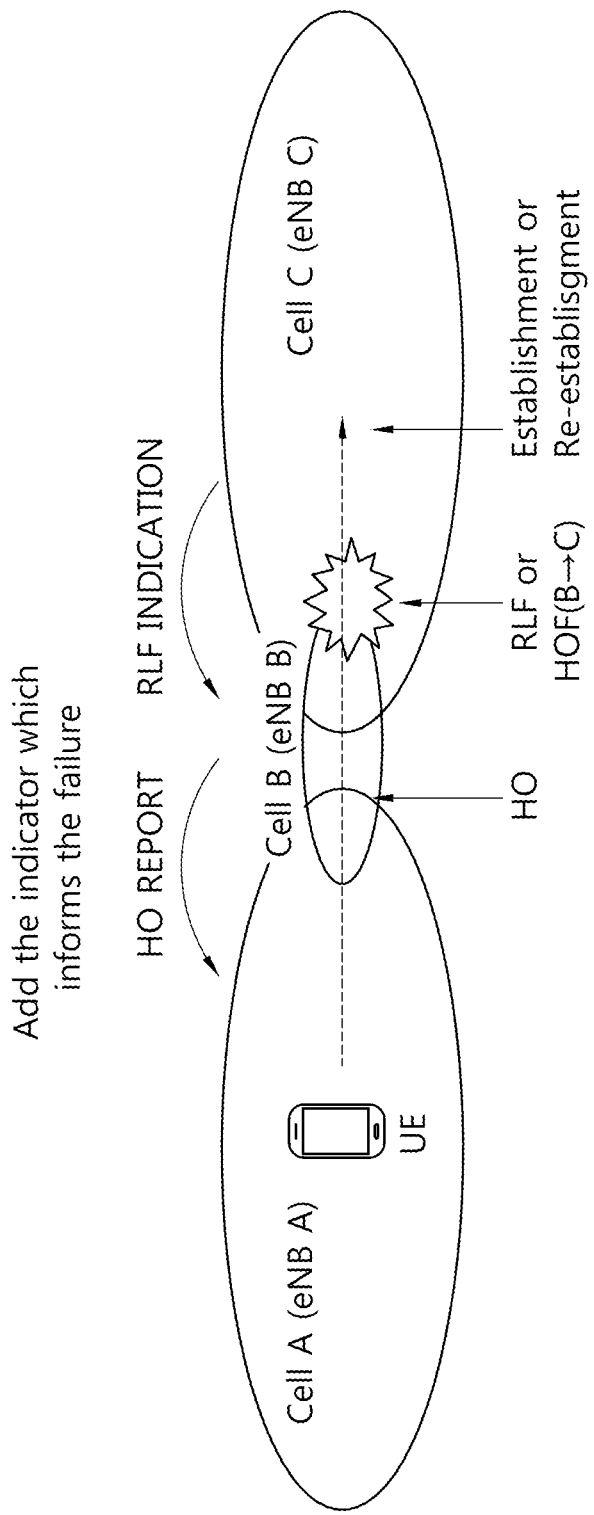
FIG. 6 shows an example of a method for transmitting a handover report message according to an embodiment of the present invention.

FIG. 6 shows an example of a method for transmitting a handover report message according to an embodiment of the present invention.

At first, an eNB B serving a coverage hole compensation cell recognizes the reason of the failure as too late handover from the cell B to the cell C, and performs handover earlier for next UEs. However even though the eNB B performs handover from the cell B to the cell C as early as possible, if the last handover completion time from the cell A to the cell B is too late, then it would be impossible to finish the handover from the cell B to the cell C before the UE leaves the coverage area of the cell B. Therefore, in this HetNet intra LTE failure case, it could be a solution that the eNB A initiates handover from the cell A to the cell B earlier and provides more time for next handover from the cell B to the cell C.

For this, the eNB B may inform the eNB A about the failure in cell B using a handover report message. The handover report message is initiated when shortly after the first handover from the cell A to the cell B was recently completed, and a failure occurred in the target cell. Accordingly, the eNB B may use the handover report message for informing the eNB A about the failure.

The handover report message may include an additional indicator for informing the eNB A about the failure. Table 1 shows an example of the handover report message according to an embodiment of the present invention.

At step S100, an eNB A transmits a measurement control message to a UE. At step S101, the UE transmits a measurement report message to the eNB A. At step S110, the eNB A transmits a handover request message to an eNB B. At step S111, the eNB B transmits a handover request acknowledgement message to the eNB A. At step S120, the eNB A transmits an RRC connection reconfiguration message to the UE.

At step S130, a mobility failure occurs, and the UE reconnects to a cell C. At step S140, the UE transmits an RRC connection reestablishment message or an RRC connection setup message to an eNB C. At step S150, the eNB C transmits an RLF indication message to the eNB B.

At step S160, the eNB B transmits a handover report message including an additional indicator to the eNB A. The handover report message may be a handover report message described in Table 1 above. That is, the additional indicator may indicate that the cell B is a coverage hole compensating cell, which means that UEs can be served by only the eNB B in some partial area in the cell B's coverage. The additional indicator may indicate that the eNB B request the eNB A to initiate handover faster than now for high-speed UEs. The additional indicator may indicate that the link failure of the UE is due to the high speed of the UE.

Figure 8:
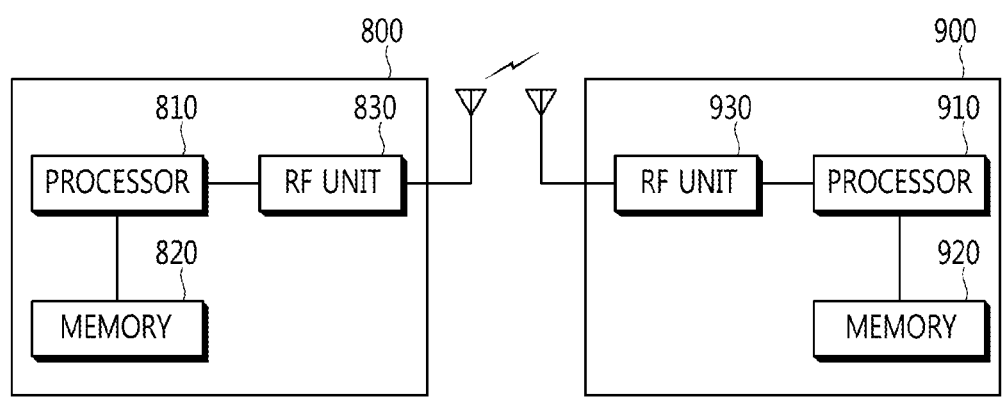
FIG. 8 is a block diagram showing wireless communication system to implement an embodiment of the present invention.

FIG. 8 is a block diagram showing wireless communication system to implement an embodiment of the present invention.

A first eNB 800 includes a processor 810, a memory 820, and an RF (radio frequency) unit 830. The processor 810

TABLE 1

| IE/Group Name | Presence | Range | IE type and reference | Semantics description | Criticality | Assigned Criticality |
|---|---|---|---|---|---|---|
| Message Type | M | | 9.2.13 | | YES | ignore |
| Handover Report Type | M | | ENUMERATED (HO too early, HO to wrong cell, <<Add INDICATOR>> ...) | | YES | ignore |
| Handover Cause | M | | 9.2.6 | Indicates handover cause employed for handover from eNB$_2$ to eNB$_1$ | YES | ignore |
| Source cell ECGI | M | | ECGI 9.2.14 | ECGI of source cell for handover procedure (in eNB$_2$) | YES | ignore |
| Failure cell ECGI | M | | ECGI 9.2.14 | ECGI of target (eventual failure) cell for handover procedure (in eNB$_1$) | YES | ignore |
| Re-establishment cell ECGI | C- ifHandover ReportType HoTo WrongCell | | ECGI 9.2.14 | ECGI of cell where UE attempted re-establishment | YES | ignore |

Referring to Table 1, the handover report type IE in the handover report message includes an additional indicator which informs the failure. The additional indicator may indicate that the cell B is a coverage hole compensating cell, which means that UEs can be served by only the eNB B in some partial area in the cell B's coverage. The additional indicator may indicate that the eNB B request the eNB A to initiate handover faster than now for high-speed UEs. The additional indicator may indicate that the link failure of the UE is due to the high speed of the UE.

Figure 7:
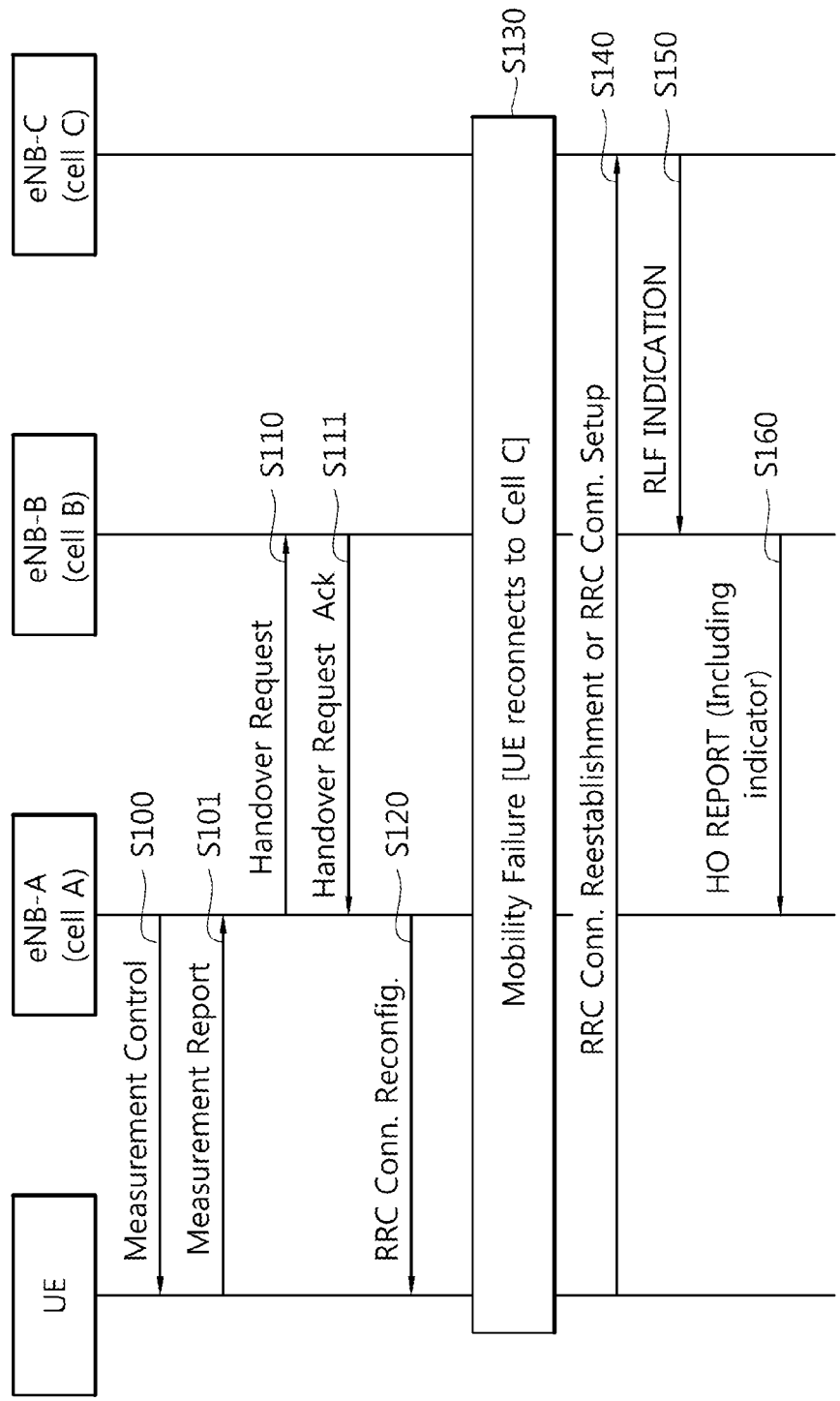
FIG. 7 shows another example of a method for transmitting a handover report message according to an embodiment of the present invention.

FIG. 7 shows another example of a method for transmitting a handover report message according to an embodiment of the present invention.

may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A second eNB 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purpose of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for transmitting, by a first eNodeB (eNB), a handover report message in a wireless communication system, the first eNB serving a first cell which is a coverage hole compensating cell between a source cell and a second cell, the method comprising:
    performing a handover procedure for a user equipment (UE) with a source eNB serving the source cell, the handover procedure indicating a procedure for a first handover between the source cell and the first cell;
    receiving a radio link failure (RLF) indication message for indicating a radio link failure for a second handover between the first cell and the second cell from a second eNB serving the second cell; and
    transmitting a handover report message including:
        an indicator for indicating the radio link failure to the source eNB, the indicator further indicating:
            a request for initiating a third handover between the source cell and the first cell earlier than a predetermined initial time and
            a request for providing an additional time for a fourth handover between the first cell and the second cell;
        a handover cause field for indicating a handover cause employed for the first handover;
        a source cell identifier field;
        a first cell identifier field; and
        a second cell identifier field,
        wherein the first handover and second handover indicate a handover performed before receiving radio link failure (RLF) indication message, and
        wherein the third handover and the fourth handover indicate a handover to be performed after receiving a RLF indication message.

2. The method of claim 1, wherein the indicator further indicates that the first cell is the coverage hole compensating cell.

3. The method of claim 1, wherein the indicator further indicates that the radio link failure is due to a high speed of the UE.

4. The method of claim 1, wherein the UE is moving from the source cell to the second cell through the first cell.

5. A method for receiving, by a source,eNodeB (eNB), a handover report message in a wireless communication system, a first target eNB serving a first target cell which is a coverage hole compensating cell between a source cell served by the source eNB and a second target cell, the method comprising;
    performing a handover procedure for a user equipment (UE) with the first target eNB, the handover procedure indicating a procedure for a first handover between the source cell and the first target cell; and
    receiving a handover report message including:
        an indicator for informing a radio link failure for a second handover between the first target cell and the second target cell from the first target eNB, the indicator further indicating:
            a request for initiating a third handover between the source cell and the first target cell earlier than a predetermined initial time; and
            a request for providing an additional time for a fourth handover between the first target cell and the second target cell;
        a handover cause field for indicating a handover cause employed for the first handover;
        a source cell identifier field:
        a first target cell identifier field; and
        a second target cell identifier field,
        wherein the first handover and second handover indicate a handover performed before receiving radio link failure (RLF) indication message, and
        wherein the third handover and the fourth handover indicate a handover to be performed after receiving a RLF indication message.

6. The method of claim 5, wherein the indicator further indicates that the first target cell is the coverage hole compensating cell.

7. The method of claim 5, wherein the indicator further indicates that the radio link failure is due to a high speed of the UE.

8. The method of claim 5, wherein the UE is moving from the source cell to the second target cell through the first target cell.

9. A first eNodeB (eNB) in a wireless communication system, the first eNB serving a first cell which is a coverage hole compensating cell between a source cell and a second cell, the first eNB comprising:
    a radio frequency (RF) unit for transmitting or receiving a radio signal; and
    a processor, operatively coupled to the RF unit, and configured to:
        perform a handover procedure for a user equipment (UE) with a source eNB serving the source cell, the handover procedure indicating a procedure for a first handover between the source cell and the first cell;
        receive a radio link failure (RLF) indication message for indicating a radio link failure for a second handover between the first cell and the second cell from a second eNB serving the second cell; and transmit a handover report message including an indicator for informing the radio link failure to the source eNB, the indicator further indicating:
- a request of initiating a third handover between the source cell and the first cell earlier than a predetermined initial time and
- a request of providing an additional time for a fourth handover between the first cell and the second cell,
- a handover cause field for indicating a handover cause employed for the first handover;
- a source cell identifier field;
- a first cell identifier field; and
- a second cell identifier field,
- wherein the first handover and second handover indicate a handover performed before receiving radio link failure (RLF) indication message, and
- wherein the third handover and the fourth handover indicate a handover to be performed after receiving a RLF indication message.

10. The first eNB of claim 9, wherein the indicator further indicates that the first cell is the coverage hole compensating cell.

11. The first eNB of claim 9, wherein the indicator further indicates that the radio link failure is due to a high speed of the UE.

12. The first eNB of claim 9, wherein the UE is moving from the source cell to the second cell through the first cell.

* * * * *